Figure 1:
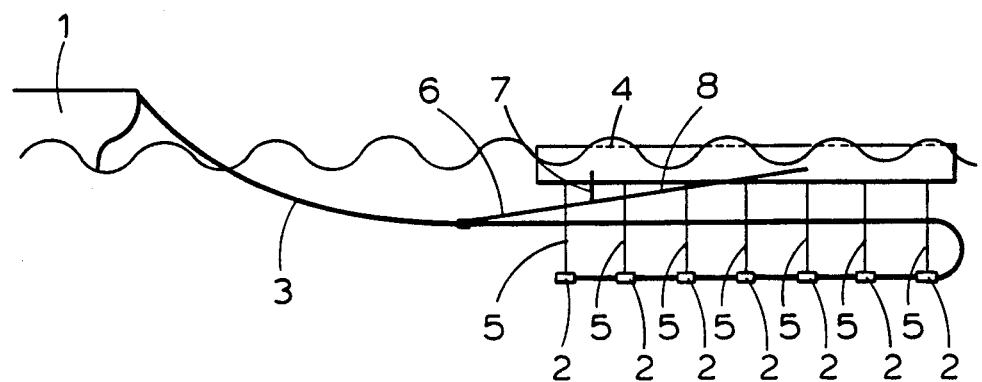

United States Patent [19]

Haugland et al.

[11] Patent Number: 4,860,264
[45] Date of Patent: Aug. 22, 1989

[54] ARRANGEMENT FOR CARRYING OUT SEISMIC PROSPECTION OF THE SEA BED

[75] Inventors: Tor A. Haugland, Rykkin; Atle Kleiven, Myking; Ole K. Selvaer, Selvaer, all of Norway

[73] Assignee: Geophysical Company of Norway A/S, Hovik, Norway

[21] Appl. No.: 193,126

[22] Filed: May 5, 1988

Related U.S. Application Data

[63] Continuation of Ser. No. 43,163, Apr. 27, 1987, abandoned, which is a continuation of Ser. No. 805,250, Dec. 4, 1985, abandoned, which is a continuation of Ser. No. 395,072, Jun. 23, 1982, abandoned.

[30] Foreign Application Priority Data

Apr. 10, 1981 [NO] Norway .............................. 811256

[51] Int. Cl.$^4$ .............................................. G01V 1/38
[52] U.S. Cl. ..................................... 367/17; 114/246; 114/253
[58] Field of Search ........................ 367/15, 16, 20, 17, 367/18; 114/242, 244, 246, 253

[56] References Cited

U.S. PATENT DOCUMENTS

| 274,955 | 12/1956 | Toomey | 340/7 |
|---|---|---|---|
| 3,953,826 | 4/1976 | Brundrit et al. | 367/23 |
| 4,130,078 | 12/1978 | Cholet | 114/244 |
| 4,323,989 | 4/1982 | Huckabee et al. | 367/153 |

FOREIGN PATENT DOCUMENTS

| 1025288 | 1/1978 | Canada . | |
|---|---|---|---|
| 0018053 | 10/1980 | European Pat. Off. . | |
| 927520 | 1/1955 | France . | |
| 0012086 | 6/1980 | France | 441/21 |
| 0004718 | 8/1913 | United Kingdom . | |
| 826932 | 1/1960 | United Kingdom . | |
| 1551635 | 8/1979 | United Kingdom . | |
| 2047406 | 11/1980 | United Kingdom . | |

Primary Examiner—Thomas H. Tarcza
Assistant Examiner—Ian J. Lobo
Attorney, Agent, or Firm—Ladas & Parry

[57] ABSTRACT

Air guns to be fired in water for carrying out seismic prospecting of the sea bed are suspended from a single rigid buoyant-body pararane so that the position of the air guns in the water is not unfavorably influenced by wave movements on the water surface.

7 Claims, 2 Drawing Sheets

ARRANGEMENT FOR CARRYING OUT SEISMIC PROSPECTION OF THE SEA BED

This is a continuation of co-pending application Ser. No. 043,163 filed on Apr. 27, 1987 which is a continuation of 805,250 filed Dec. 4, 1985 which is a continuation of 395,072 filed Sept. 30, 1981, all now abandoned.

The present invention relates to an arrangement for seismic preospection of a sea bed.

In one form of seismic prespecting, powerful sound waves are transmitted towards the sea bed or bottom and sound wave reflections from various strata under the bottom are recorded. The recordings are used as a basis for closer studies.

The sound waves are generated by air guns suspended from buoys or other buoyant bodies to be a few meters beneath the surface of the sea, supplied with compressed air from a towing vessel, and fired according to a certain program. Each air gun was suspended from a separate buoy, so the positions of the air guns were strongly influenced by even small wave movements, and these deviations from presumed position may had an unfavourable effect on the results of the measurements. This particularly applied to variations in the depth of the air guns beneath the sea surface, but also the mutual horizontal spacing of the air guns is of much interest in this connection.

The purpose of the invention is to eliminate the above drawback so that the influence of the wave movements on the measuring results by the position variations referred to, may be minimised. According to the invention this is obtained by suspending the air guns in an appropriate number from a unitary; relatively rigid buoyant body. For example, this may be a flaot, a paravane or the like, which is little or not at all influenced by small wave movements, and which follow larger wave movements in a more correct way from a seismic prospecting point of view, than a chain of air guns respectively suspended from separate buoys.

Figure 2:
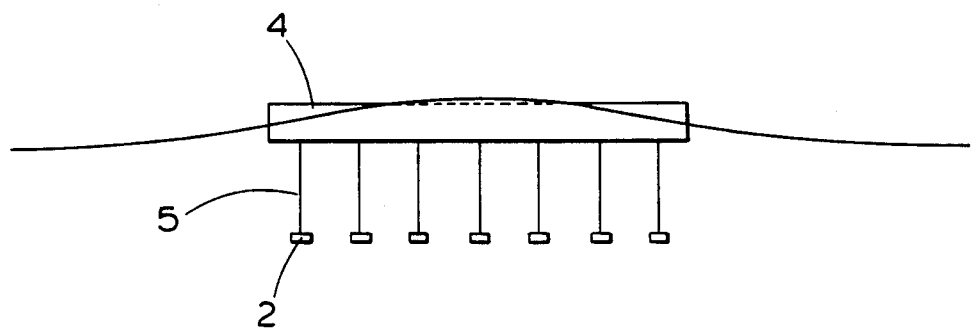
Figure 3:
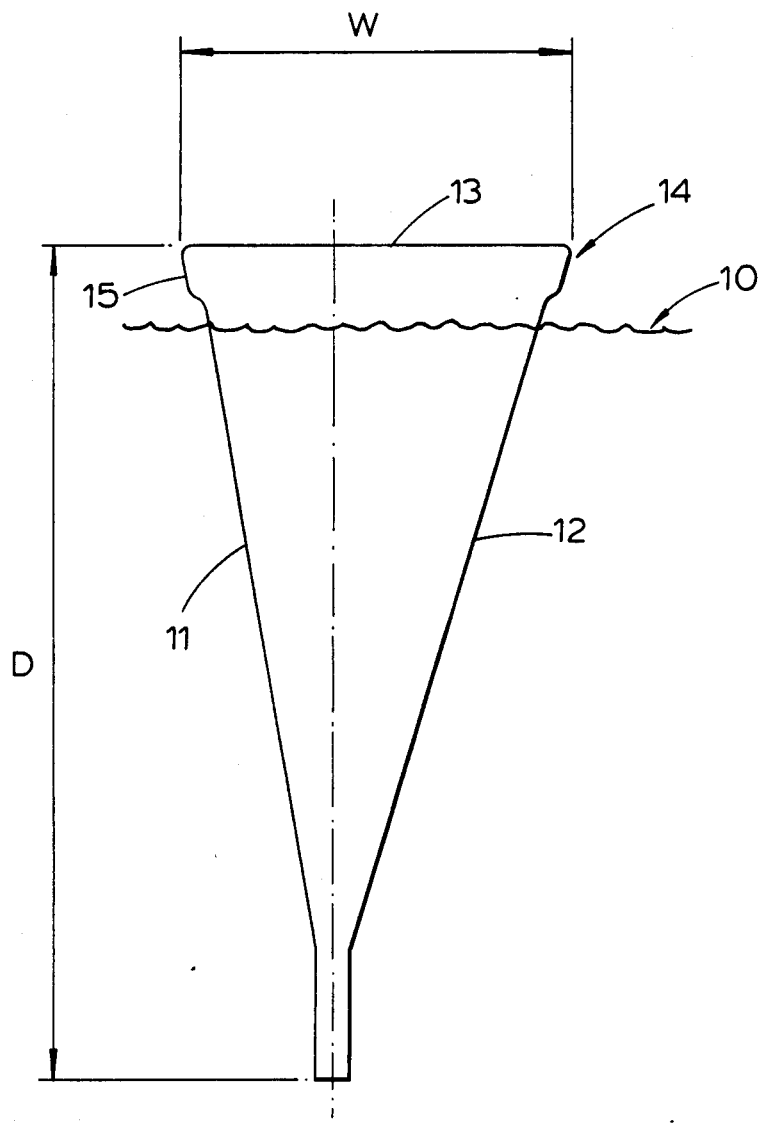

The invention is characterized by the features recited in the claims and will be explained more closely in the following with reference to the drawing in which:

FIG. 1 shows, together with a sea and the aft end of vessel which tows a paravane, a side elevation of the paravane with air guns according to the invention, FIG. 2 shows the same paravane as FIG. 1 floating in a different sea wave form, and FIG. 3 shows an end view of the paravane of FIGS. 1 and 2 and, thereby, the preferred profile or hull shape of the paravane.

In FIG. 1, a vessel 1 is towing air guns 2 which, in a manner known per se, are supplied with compressed air through a hose 3 extending between the vessel 1 and the air guns 2. The air guns are fired according to a certain program and the propagation pattern of the sound waves form the basis for evaluating the structure of the sea bed. Experience has shown that a number of, for example, seven guns per paravane give a satisfactory sound pulse shape, provided that one knows at the firing instant where the guns are located in the water. It is difficult to determine this with the previously known arrangements of such air guns when there are wave formations on the water surface. Even small waves led to changes in the position of the air guns independently of each other, with accompanying unfavourable effects, as explained above.

According to the invention, air guns 2 are suspended from a buoyant-body paravane 4 which may be an elongate float of sufficient buoyancy, each air gun being attached to the buoyant body by of a line 5. In the example shown the buoyant body is a good 20 meters long and is towed behind the vessel 1 by a line 6 which, along a portion of its length remote from the paravane, may combined with the hose 3. Advantageously, the buoyant body 4 may be shaped as a paravane (See FIG. 3), because then it is able to follow the vessel 1 laterally with respect thereto, and there may be employed two or more paravanes on each side of the vessel. By firing simultaneously, for example, four series of air guns, there is obtained a sound wave pattern which is of advantage for the investigations. The paravane 4 with associated air guns 2 will have a more quiet movement in the sea than air guns suspended each from a separate buoy. In FIG. 1 there is an indication of small sea waves which would have a disturbing effect on the previously known arrangements, but which in the case of the paravane according to the invention, give satisfactory results.

Also in the case of increasing wave length, in particular in the case of ocean sells which are often present, the air guns 2 with the arrangement according to the invention, will have a more correct movement in the sea, which is shown in FIG. 2. All air guns beneath the buoyant body will be aligned and will have substantially the same depth under the water surface.

FIG. 3 shows that the transverse hull shape of a paravane as a substantially triangular profile of side faces 11, 12 and a deck 13. There is also indicated a water surface 10, the deck 13 of the paravane lying a small distance above the water surface, so that there will be a rather low free-board. The deck 13 is shown as being mainly plane, i.e. generally planar and one side face 11 of the hull forms an approximate right angle with the deck 13. The other, i.e. opposite face 12 forms an acute angle with the one side face 11 divergent toward the deck 13 so that the depth D of the hull will be substantially larger than the width W thereof. With a length of for example 20 m as mentioned above, the width may be 0.35 m and the dept 0.75 m. The asymmetry of the hull profile facilitates towing the paravane out laterally with respect to the vessel, as mentioned above.

An extended part 15 projects laterally from the side faces at the deck 13 above the side faces 11 and 12. This projecting part is advantageous inter alia for the stability of the paravane, since it constitutes a buoyant reserve. It is obvious that such a projecting part may be formed only on one side of the hull, and in such case above the more vertical side face 11.

With the hull shape shown, which has a large depth in relation to its width, narrowing downwardly, it is obtained, in principle, that the immersed or wetted surface of the hull is subject to a minimum of variations in operation, which means that the paravane or buoyant body is subjected to the least possible undesired movements or accelerations which may result in variation of the air gun positions. Having this in mind it is also of substantial importance that the towing line from the vessel is attached directly to the buoyant body, as will appear from FIG. 1, and not to the air guns, as hitherto has been usual in seismic prospecting.

The anchoring of towing line 6 to the buoyant body 4 according to FIG. 1 is effected via two steel wire elements 7 and 8 each attached at one end to the towing line 6 and at the opposite end to one side face of the paravane facilitate the towing of the buoyant-body paravane out laterally with respect to the vessel.

The example shown only serves to illustrate the invention and does not constitute any limitation of the protection afforded by this patent, since there may well be thought of other embodiments than a continuous, floating body. For example there may be designed some form of a rigid carrier from which the air guns are suspended and which is maintained at an appropriate level in the sea by two or more floats which float in the surface, and each of which preferably is shaped as a buoyant body according to the above.

We claim:

1. Apparatus for seismic prospection of a sea bed, comprising:
   an elongate, buoyant-body paravane comprising a planar deck on only one hull, the depth of the hull from the deck being at least about twice as large as the width of the deck for facilitating towing the paravane out laterally with respect to a towing vessel;
   air guns;
   suspending means for relatively suspending the air guns from the paravane;
   a towing line for towing connection to the vessel;
   attachments means for attaching the towing line to the paravane; and
   air-supply means for supplying compressed air to the air guns from the vessel.

2. The apparatus according to claim 1, wherein the hull of the paravane comprises one longitudinal side face forming a right angle with the deck and an opposite longitudinal side face forming an acute angle with the one side face divergent therefrom toward the deck for an asymmetric, triangular transverse hull profile.

3. The apparatus according to claim 2, wherein, adjacent the deck, one or both side faces of the paravane have a lateral projection for a reserve buoyancy.

4. The apparatus according to claim 2, wherein the attachment means comprises two elements, each attached at one end to the towing line and at the opposite end to the one of the side faces for facilitating towing the paravane out latterly with respect to the vessel.

5. The apparatus according to claim 1, wherein the towing line and the air-supply means are combined over a portion of their lengths remote from the paravane.

6. The apparatus according to claim 2, wherein the towing line and the air-supply means are combined over a portion of their lengths remote from the paravane.

7. The apparatus according to claim 6, wherein adjacent the deck, one or both side faces of the paravane have a lateral projection for a reserve buoyancy, and the attachment means comprises two elements, each attached at one end to the towing line and at the opposite end to the one of the side faces for facilitating towing the paravane out latterly with respect to the vessel.

* * * * *